US011334987B2

(12) United States Patent
Vija et al.

(10) Patent No.: US 11,334,987 B2
(45) Date of Patent: May 17, 2022

(54) PHYSICS-CONSTRAINED NETWORK AND TRAINING THEREOF

(71) Applicant: Siemens Medical Solutions USA, Inc., Malvern, PA (US)

(72) Inventors: Alexander Hans Vija, Evanston, IL (US); Xinhong Ding, Buffalo Grove, IL (US); Francesc dAssis Massanes Basi, Chicago, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 132 days.

(21) Appl. No.: 15/929,502

(22) Filed: May 6, 2020

(65) Prior Publication Data

US 2021/0110531 A1 Apr. 15, 2021

Related U.S. Application Data (60) Provisional application No. 62/912,815, filed on Oct. 9, 2019.

(51) Int. Cl.
  *G06K 9/00* (2022.01)
  *G06T 7/00* (2017.01)
  *G06N 3/08* (2006.01)

(52) U.S. Cl.
  CPC .............. *G06T 7/0012* (2013.01); *G06N 3/08* (2013.01); *G06T 2207/10104* (2013.01); *G06T 2207/20081* (2013.01); *G06T 2207/20084* (2013.01)

(58) Field of Classification Search
  CPC ......... G06T 7/0012; G06T 2207/10104; G06T 2207/20081; G06T 2207/20084; G06T 2200/04; G06T 2207/10081; G06T 2207/10108; G06T 2207/30016; G06T 5/50; G06T 5/009; G06N 3/08; G06N 3/0454; G06N 3/084
  USPC .......................................................... 382/128
  See application file for complete search history.

(56) References Cited

U.S. PATENT DOCUMENTS

| | | | | |
|---|---|---|---|---|
| 10,482,639 | B2 * | 11/2019 | Li | G06K 9/6256 |
| 10,504,027 | B1 * | 12/2019 | Kim | G06V 10/10 |
| 2017/0068887 | A1 * | 3/2017 | Kwon | G06N 3/0454 |
| 2018/0060722 | A1 * | 3/2018 | Hwang | G06N 3/0454 |
| 2018/0240257 | A1 * | 8/2018 | Li | G06N 3/084 |
| 2018/0300907 | A1 * | 10/2018 | Ding | G06T 11/006 |
| 2019/0235481 | A1 * | 8/2019 | Takigawa | G05B 23/0281 |
| 2021/0133582 | A1 * | 5/2021 | Refaat | G05D 1/0088 |
| 2021/0216823 | A1 * | 7/2021 | Oosake | A61B 6/00 |
| 2021/0232947 | A1 * | 7/2021 | Sasaya | G06N 20/00 |

* cited by examiner

*Primary Examiner* — Van D Huynh (57) ABSTRACT

A system and method includes input of a plurality of sets of training data to a neural network to generate a plurality of sets of output data, determination of a first loss based on the plurality of sets of output data and on the plurality of sets of ground truth data, determination if a second loss based on the plurality of sets of output data and one or more physics-based constraints, and modification of the neural network based on the first loss and the second loss.

15 Claims, 8 Drawing Sheets

PHYSICS-CONSTRAINED NETWORK AND TRAINING THEREOF

CROSS-REFERENCE TO RELATED APPLICATIONS

The present application is related to and claims priority to U.S. Provisional Patent Application No. 62/912,815 filed Oct. 9, 2019, the contents of which are incorporated by reference in their entirety, for all purposes.

BACKGROUND

Conventional artificial neural networks are trained to generate a desired output based on labeled training data. The output of an artificial neural network may comprise an image, a classification, a regression result, etc. Generally, the goal of training is to minimize a difference between the output of the artificial neural network and a known "correct" result, i.e. ground truth, over a large sample of inputs.

This minimization problem is solved by iteratively modifying the artificial neural network. These modifications may include, for example, modifications to the interconnections between network layers, to weights associated with the interconnections, to weights associated with network nodes, and to the structure of the network. Notably, the modifications do not incorporate any a priori knowledge, such as knowledge of a relationship between the input and the desired output, or of constraints other than the minimization constraint. Accordingly, the solution space achieved through conventional training might be unsuitable for some inputs.

DETAILED DESCRIPTION

The following description is provided to enable any person in the art to make and use the described embodiments and sets forth the best mode contemplated for carrying out the described embodiments. Various modifications, however, will remain apparent to those in the art.

Some embodiments constrain network training based on known physical phenomena. For example, a network may be trained to minimize an objective function as is known in the art, and simultaneously trained to minimize an error associated with required physical characteristics of the output. The physical characteristics may be evaluated based solely on the output and on known physical constraints (e.g., to ensure that the output is consistent with physical reality), or on the output, known physical constraints, and one or more network inputs (e.g., to ensure that a required physical relationship between the input and the output is satisfied). Embodiments may therefore provide an improved solution space in comparison to conventional training systems.

Figure 1:
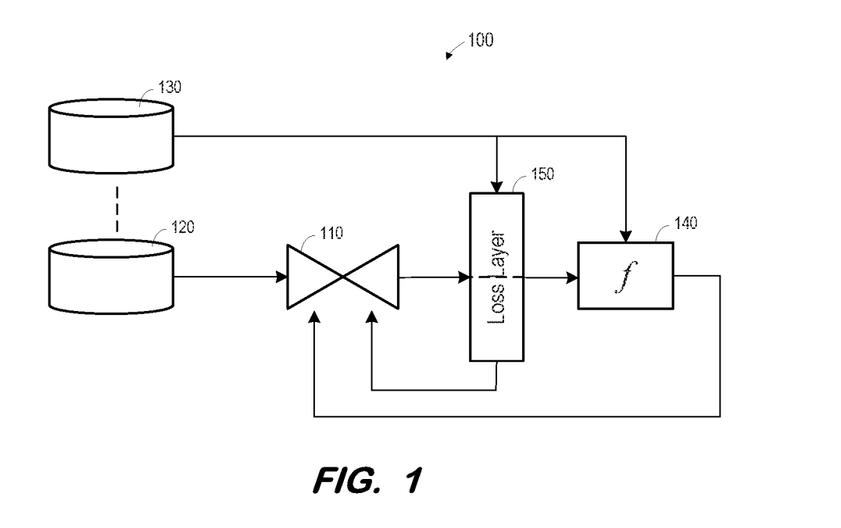
FIG. 1 is a block diagram of a system to train a neural network according to some embodiments.

FIG. 1 illustrates system 100 to train artificial neural network 110 according to some embodiments. Network 110 may comprise any type of learning network that is or becomes known. Broadly, network 110 may comprise a network of neurons which receive input, change internal state according to that input, and produce output depending on the input and internal state. The output of certain neurons is connected to the input of other neurons to form a directed and weighted graph. The weights as well as the functions that compute the internal state can be modified via training as will be described below. Network 110 may comprise any one or more types of artificial neural network that are or become known, including but not limited to convolutional neural networks, recurrent neural networks, long short-term memory networks, deep reservoir computing and deep echo state networks, deep belief networks, and deep stacking networks.

System 100 trains network 110 to implement a function. The training is based on training data 120 and corresponding ground truth data 130, and on physical constraint evaluator 140. Each set of training data 120 and each corresponding set of ground truth data 130 may comprise a single data value, multi-dimensional data (e.g., two-dimensional or three-dimensional image data), or multiple single and/or multi-dimensional values.

Training data 120 is fed into network 110 and loss layer 150 determines a loss based on the resulting output of network 110 and ground truth data 130. For example, a given set of training data 120 is input to network 110 and loss layer 150 determines a difference between the resulting output and particular data of ground truth data 130 which corresponds to the input set of training data 120. This process repeats for each set of training data 120 to determine a total loss $\mathcal{L}_1$. As is known in the art, the total loss $\mathcal{L}_1$ is back-propagated to network 110 in order to modify network 110 in an attempt to minimize $\mathcal{L}_1$.

According to some embodiments, and for each input set of training data 120, the output of network 100 is also received by physical constraint evaluator 140. Physical constraint evaluator 140 generates a loss $\mathcal{L}_2$ based on the extent to which each output deviates from one or more specified physical constraints which evaluator 140 has been designed to evaluate. In the illustrated embodiment, the determination is based on known physical characteristics and particular ground truth data 130 corresponding to the particular output of network 110, but embodiments are not limited thereto. The determination may be based on no external information (e.g., determination of whether the statistics of the output conform to a Poisson distribution) or may be based on ground truth data which differs from the ground truth data used by loss layer 150. Evaluator 140 may be implemented by a computing device executing a programmed algorithm or calculation. Evaluator 140 may itself comprise one or more trained networks.

The loss $\mathcal{L}_2$ generated by physical constraint evaluator 140 is back-propagated to network 110 in order to modify network 110 in an attempt to minimize loss $\mathcal{L}_2$. The two back-propagated losses $\mathcal{L}_1$ and $\mathcal{L}_2$ may be used to modify network 110 in any suitable manner. In some embodiments, the two losses are weighted and combined into a single loss (e.g., $\mathcal{L} = \alpha \mathcal{L}_1 + (1-\alpha)\mathcal{L}_2$) which is used to modify network. Network 110 is iteratively modified in this manner until the losses reach acceptable levels or training otherwise terminates (e.g., due to time constraints or to the losses asymptotically approaching a lower bound).

Losses $\mathcal{L}_1$ and $\mathcal{L}_2$ enforce two different constraints. Taking the example of network 110 which outputs images, training network 110 to minimize loss $\mathcal{L}_1$ between the output images and the corresponding ground truth images may ensure that the intensities of corresponding pixels match within a particular tolerance. Minimization of loss $\mathcal{L}_2$, on the other hand, ensures that the output images conform to a constraint dictated by physics, either independent of other data (e.g., Poisson distribution) or with respect to other data (e.g., see the linear attenuation coefficient map example below).

Figure 2:
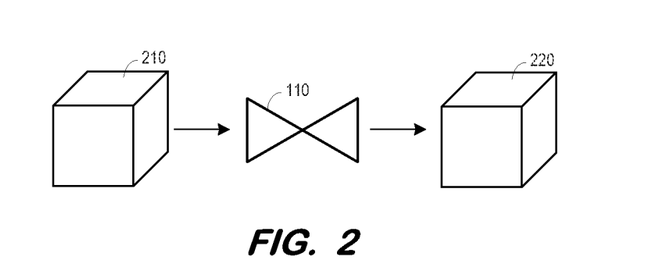
FIG. 2 is a block diagram of a system deploying the trained network of FIG. 1.

FIG. 2 illustrates deployment of trained network 110 according to some embodiments. Trained network 110 receives image volume 210 as input and outputs image volume 220. Due to the training described with respect to FIG. 1, output image 220 conforms both to the learned correspondence between training data 120 and ground truth data 130, and to the physical constraint(s) evaluated by evaluator 140.

Figure 3:
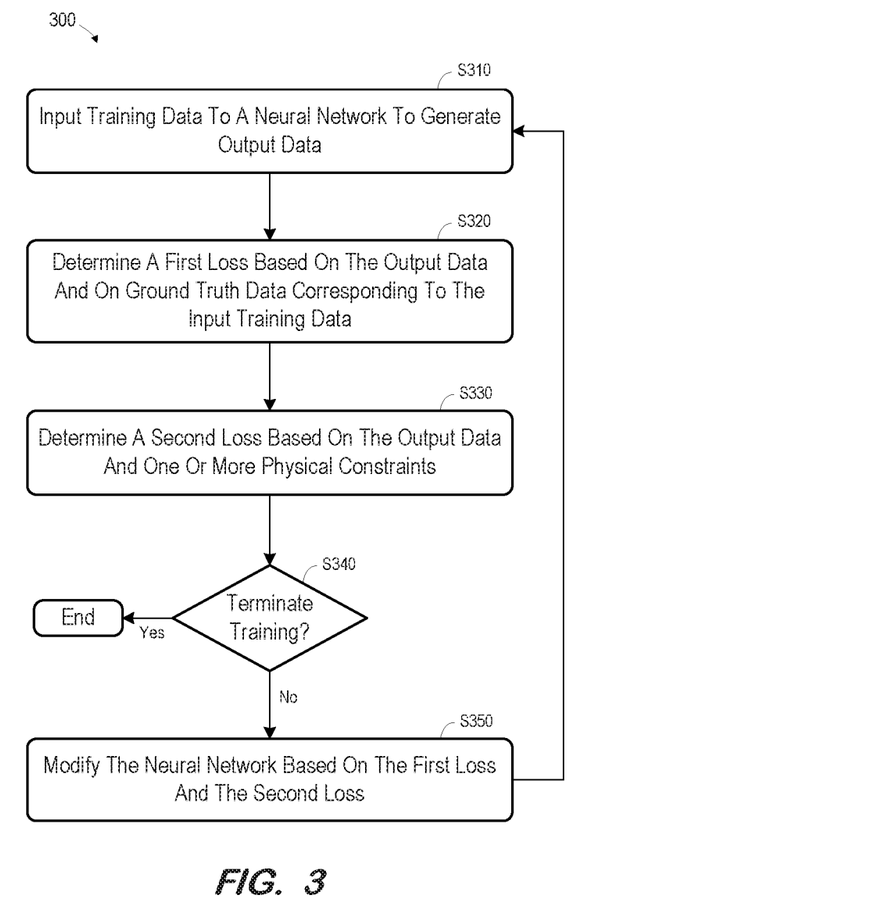
FIG. 3 is a flow diagram of a network training process according to some embodiments.

FIG. 3 is a flow diagram of process 300 to describe the training depicted in FIG. 1 according to some embodiments. Process 300 and the other processes described herein may be performed using any suitable combination of hardware and software. Software program code embodying these processes may be stored by any non-transitory tangible medium, including a fixed disk, a volatile or non-volatile random access memory, a floppy disk, a CD, a DVD, a Flash drive, or a magnetic tape. Embodiments are not limited to the examples described below.

Initially, at S310, training data is fed into a neural network to generate output data. It may be assumed that many sets of training data are fed into the network at S310, and the network generates output data for each input set of training data. The training data and the network structure may comprise any that are or become known.

Next, at S320, a loss is determined based on the output data and on ground truth data associated with each set of input training data. In one example, a difference is determined between the output data resulting from each input set of training data and ground truth data, or labels, corresponding to the input set of training data. These losses are aggregated in any known manner (e.g., mean square error) to determine first loss $\mathcal{L}_1$.

A second loss is determined at S330 based on one or more physical constraints and on the output data. For a given set of input data, and according to some embodiments, the second loss may be determined by evaluating whether the corresponding output data and the corresponding ground truth data exhibit a particular relationship dictated by known physical properties. As described above, the determination at S330 may simply comprise determining whether the output data conforms to one or more physical characteristics.

In one example described in detail below, each set of output data is a linear attenuation coefficient map and is compared to a corresponding ground truth linear attenuation coefficient map at S320. Minimization of the first loss therefore ensures that the pixels intensities of each map match within a particular tolerance. However, to ensure that the output map functions similarly to the corresponding ground truth when used for attenuation correction, the line integrals of every projection at every pixel should also be equal. Accordingly, S330 comprises determining the difference in these line integrals over the set of training data. Embodiments are not limited to this example.

At S340, it is determined whether to terminate training. The determination may be based on whether the first loss and the second loss have reached acceptable levels, based on evaluation of the performance of the currently-modified network on a set of test input data, based on an elapsed amount of training time or number of training epochs, and or on other criteria.

If the determination at S340 is negative, the neural network is modified at S350 based on the first loss and the second loss. The two losses may be used to modify the network in any suitable manner. Flow then returns to S310 and repeats as described above. In this regard, each iteration of S310 through S350 is considered a single training epoch.

Figure 4:
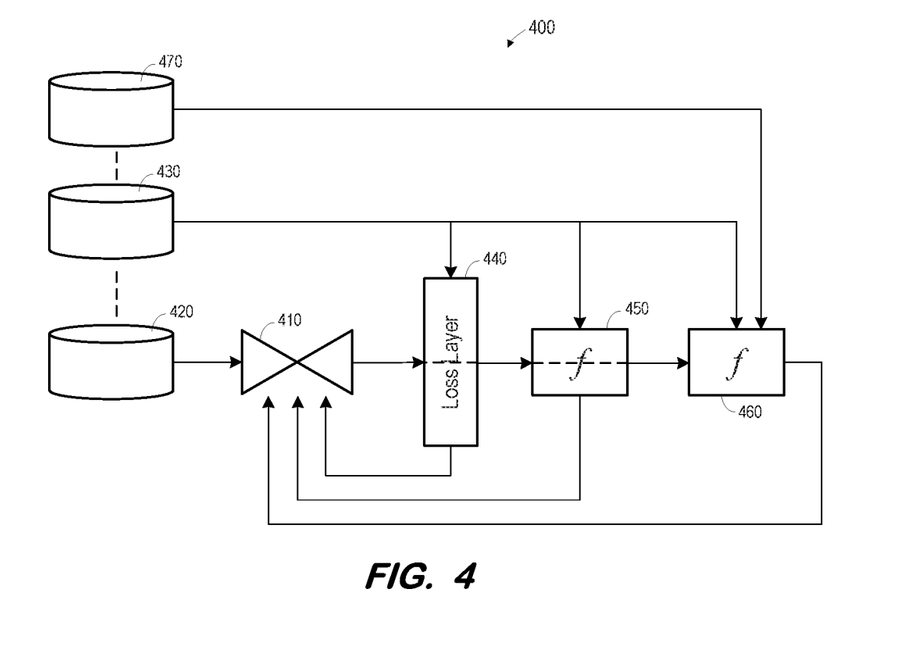
FIG. 4 is a block diagram of a system to train a neural network according to some embodiments.

FIG. 4 illustrates training system 400 according to some embodiments. System 400 includes two physical constraint evaluators 450 and 460. Each of evaluators 450 and 460 may operate as described above with respect to evaluator 140, to determine a loss based on the output of network 410 and on respective physical constraints and to back-propagate that loss to network 410 with the goal of minimizing those losses. The back-propagated losses may be combined into a single loss based on any suitable weighting as described above.

Like system 100, evaluator 450 and loss layer 440 determine their respective losses based on the output of network 410 and on ground truth data 430. Evaluator 460, on the other hand, determines its loss based on the output of network 410 and on ground truth data 470. As illustrated by the dashed lines, a correspondence exists between respective sets of training data 420, ground truth data 430 and ground truth data 470. In some embodiments, evaluators 450 and 460 both determine their loss based on the output of network 410 and on ground truth data 430, but with respect to different physical constraints and/or using a different algorithm.

Figure 5:
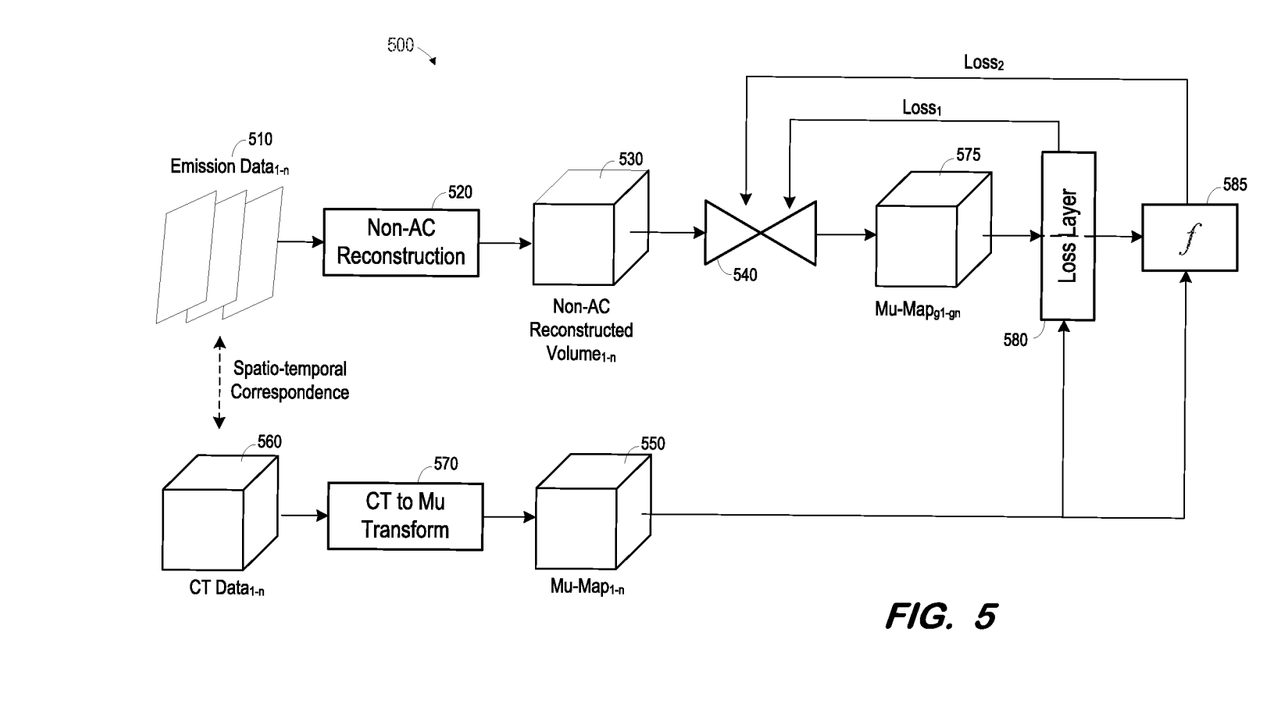
FIG. 5 is a block diagram of a system to train a neural network to output a linear attenuation coefficient map according to some embodiments.

FIG. 5 illustrates a particular implementation of training system 100 according to some embodiments. Training system 500 may be used to train network 540 to generate mu-maps according to some embodiments.

According to emission imaging, an imaging source (e.g., a gamma ray-emitting radiopharmaceutical) internal to the subject (e.g., due to injection or ingestion thereof) emits source radiation (e.g., gamma rays) from within the subject to a detector. Absorption or scattering within the subject tissue attenuates the source radiation prior to reception of the source radiation by the detector. Images are created by determining the attenuation caused by the subject tissue. This determination is difficult in the case of emission imaging because the amount of radiation being emitted by the emission source(s) within the subject cannot be measured directly.

Therefore, in emission imaging such as single-photon-emission-computer-tomography (SPECT) and positron-emission-tomography (PET), image reconstructions often incorporate attenuation corrections to generate visually realistic and clinically accurate images. The most-common attenuation corrections are based on Linear Attenuation Coefficient (LAC) maps ("mu-maps") derived from a Computed Tomography (CT) scan of the subject tissue. Such a CT scan is typically performed during the same imaging session at which the emission imaging is performed.

Training system 500 may be used to train network 540 to generate a mu-map based on emission data only. Accordingly, some embodiments provide technical improvements over existing systems which require a separate CT scan and its resultant additional radiation dose, and/or which produce unsatisfactory mu-map estimations from emission data and resulting poor quality reconstructed images. One such technical improvement is the ability to generate medical images which are more precise and/or require less radiation exposure than existing systems.

The training data for system 500 is generated based on a plurality of sets of emission data, where each set includes a plurality of two-dimensional projection images associated with respective projection angles. Each set of emission data$_{1-n}$ 510 is received by non-attenuation-corrected reconstruction unit 520, which performs a reconstruction operation as is known in the art to generate corresponding non-attenuation-corrected reconstructed volumes$_{1-n}$ 530.

The ground truth data comprises a plurality of mu-maps i-n 550. Each mu-map$_{1-n}$ 550 corresponds to a respective one of the plurality of sets of emission data$_{1-n}$ 510. For example, CT data$_1$ 560 of FIG. 5 is acquired at the same time as, or shortly before or after, emission data$_1$ 510 as described above. Transform 570 is applied to each of CT data$_{1-n}$ 560 to generate corresponding mu-map$_{1-n}$ 550. Accordingly, each mu-map$_{1-n}$ 550 corresponds to a respective set of emission data$_{1-n}$ 510.

According to some embodiments, the conversion of CT data to a mu-map includes receiving output pixel data for a pixel of a CT image. The value of the pixel data is compared to a predetermined range. If the value is within the predetermined range, a linear attenuation coefficient is calculated from the pixel data using a first conversion function corresponding to the predetermined range. If the value is outside the predetermined range, the linear attenuation coefficient is calculated from the pixel data using a second conversion function corresponding to a range outside the predetermined range. The calculated coefficient is stored in a memory as part of a mu-map, and the process repeats for each other pixel of the CT image.

During training, network 540 receives non-attenuation-corrected volumes$_{1-n}$ 530 and generates a mu-map$_{g1-gn}$ 575 for each received volume. Loss layer component 580 determines loss$_1$ by comparing each generated mu-map$_{g1-gn}$ 575 to a corresponding "ground truth" mu-map$_{1-n}$ 550. For example, network 540 generates mu-map$_{g20}$ based on non-attenuation-corrected volume$_{20}$ which was reconstructed based on emission data$_{20}$. Loss layer component 580 compares mu-map$_{g20}$ to mu-map$_{20}$, which was generated based on CT data$_{20}$ corresponding to emission data$_{20}$.

Figure 6:
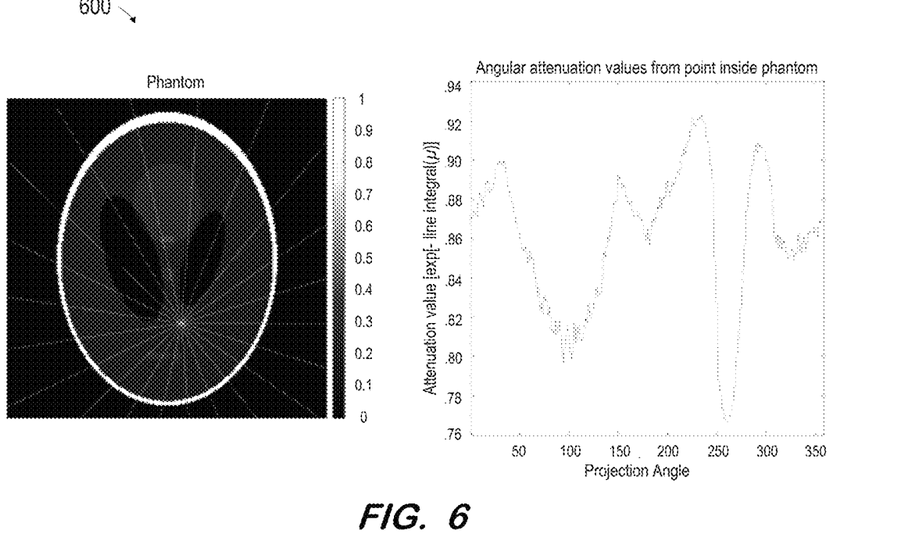
FIG. 6 illustrates a physics-based network training constraint according to some embodiments.

Physical constraint evaluator 585 also receives each generated mu-map$_{g1-gn}$ 575. Physical constraint evaluator 585 generates loss$_2$ based on the extent to which the line integrals of each generated mu-map$_{g1-gn}$ 575 deviate from those of corresponding mu-maps-n 550. FIG. 6 illustrates projection angle-specific line integral values for a particular point of an image.

For example, given n points and m directions, loss$_2$ may be determined as:

$$L_2 = \Sigma_m \Sigma_n (e^{\int_0^\infty mu\text{-}map_{g1\text{-}gn}575[x_n+tv_m]dt} - e^{\int_0^\infty mu\text{-}map_{1\text{-}n}550[x_n+tv_m]dt})^2,$$

where $x_n$ are the n points and $v_m$ are the m directions.

Such an expression may be simplified (i.e., eliminating the integrals) as:

$$L_2 = \sum_m \sum_n \left( \exp\left[\sum_t mu\text{-}map_{g1\text{-}gn}575[x_n+tv_m]\right] - \right.$$

$$\left. \exp\left[\sum_t mu\text{-}map_{1\text{-}n}550[x_n+tv_m]\right] \right)^2$$

Regardless of the formulation, loss$_2$ may reflect the difference between the mu-maps on the m directions at the n points, and forces the transport to be equally attenuated on both evaluated images.

Minimizing loss$_1$ and loss$_2$ therefore serves to match the pixels intensities of the generated mu-map$_{g1-gn}$ 575 to those of ground truth mu-maps$_{1-n}$ 550, and also match the attenuation correction provided by each generated mu-map$_{g1-gn}$ 575 to that provided by corresponding ground truth mu-map$_{1-n}$ 550.

The losses are back-propagated to network 540, which changes its internal weights, or kernel parameter values, as is known in the art. The training data may then be processed by network 540, loss layer 580 and evaluator 585 repeatedly until it is determined that the losses have reached an acceptable level or training otherwise terminates. At termination, the convolution kernels of network 540 may be considered trained. The parameter values of the trained convolutional kernels may then be deployed in a network in order to generate attenuation-corrected volumes based on emission data, and without requiring a CT data-generated mu-map.

The network training described below generates parameter values for the kernels of a fully convolutional network. Advantageously, a fully convolutional network comprising thusly-parameterized kernels may be efficiently incorporated within a SPECT or PET reconstruction algorithm to generate a mu-map prior to reconstruction of emission data based on the mu-map, without requiring any additional user interaction.

Figure 7:
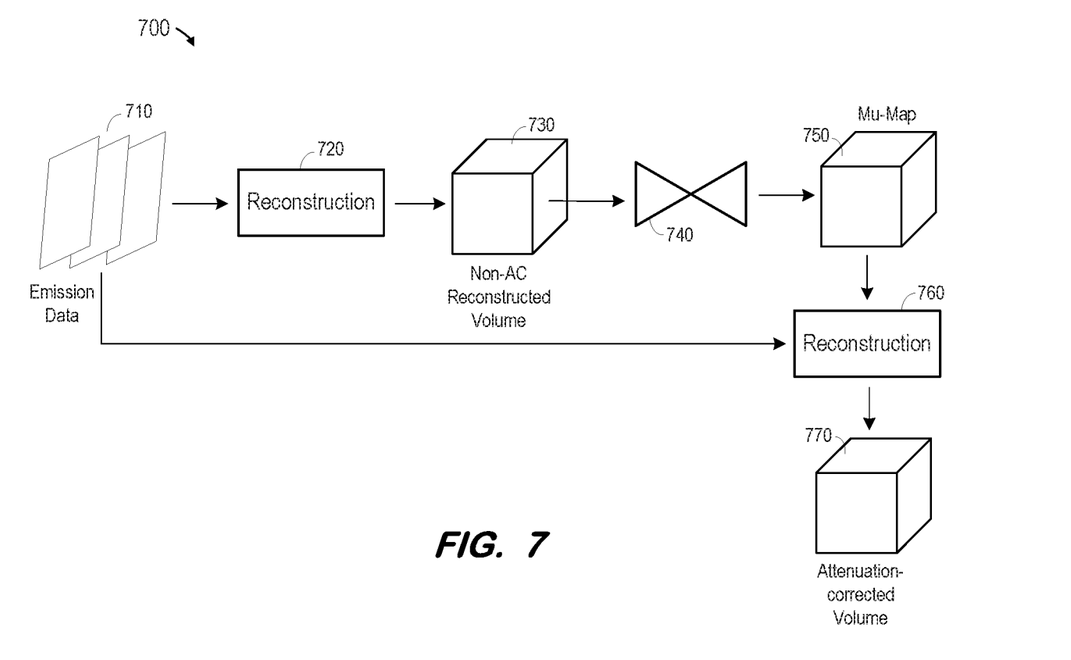
FIG. 7 is a block diagram of a system to generate an attenuation-corrected image volume based on emission data and a trained neural network according to some embodiments.

FIG. 7 illustrates deployment of a trained network according to some embodiments. Architecture 700 includes a plurality of sets of two-dimensional emission data 710 generated by an emission imaging system during a scan of a subject. As described above, such a system may comprise a SPECT system, a PET system, or another type of emission imaging system that is or becomes known. Emission data 710 may represent projection image data which is typically reconstructed into volumetric image data as is known in the art.

Emission data 710 is received by reconstruction unit 720. Reconstruction unit 720 performs a reconstruction operation on emission data 710 and outputs non-attenuation-corrected reconstructed volume 730 as is known. Reconstruction unit 720 may execute any suitable reconstruction process that is or becomes known.

Volume 730 is input to trained network 740. Network 740 operates on volume 740 in accordance with its trained parameters to generate and output mu-map 750. Mu-map 750 therefore corresponds to emission data 710. By virtue of the above-described training, the pixel intensities of mu-map 750 may be similar to those of a mu-map of the subject which would have been generated using the conventional CT-based approach. Moreover, the attenuation corrections implemented by mu-map 750 are also similar to those of the conventionally-generated mu-map.

Trained network 740 may comprise a fully-convolutional neural network having parameters trained as described herein. Network 740 is designed to receive a non-attenuation-corrected reconstructed volume and output a mu-map. According to some embodiments, network 740 includes a down-convolution portion and an up-convolution portion.

The down-convolution portion consists of a set of convolution layers, with the kernel size of each subsequent layer being less than or equal to the prior layer in order to capture increasingly fine-structured features of an input image. The up-convolution portion also includes a set of convolution layers, with the kernel size of each subsequent layer being greater than or equal to the prior layer in order to generate an output image of the same size as the input image. Network 740 may comprise any type of learning network that is or becomes known, including but not limited to a convolutional neural network.

Reconstruction unit 760 receives mu-map 750 and emission data 710 and generates attenuation-corrected volume 770 of the subject based thereon. Attenuation-corrected volume 770 is therefore generated without requiring a CT scan of the subject. Reconstruction unit 760 may be implemented by the same combination of hardware and software as reconstruction unit 720, or by a different combination.

Reconstruction unit 720, network 740, reconstruction unit 760, and each functional component described herein may be implemented in computer hardware, in program code and/or in one or more computing systems executing such program code as is known in the art. Such a computing system may include one or more processing units which execute processor-executable program code stored in a memory system. Network 740 may comprise hardware and software specifically-intended for executing algorithms based on a specified network architecture and trained kernel parameters.

In some examples, a neural network is trained based on images and ground truth de-noised images to generate de-noised images, under the additional physical constraint that the statistics of the de-noised image conforms to a Poisson distribution. Other physical constraints include but are not limited to transmittance characteristics, Young's moduli, boundary conditions, integral-based conditions, and differential-based conditions. Embodiments are not limited to the examples described herein.

Figure 8:
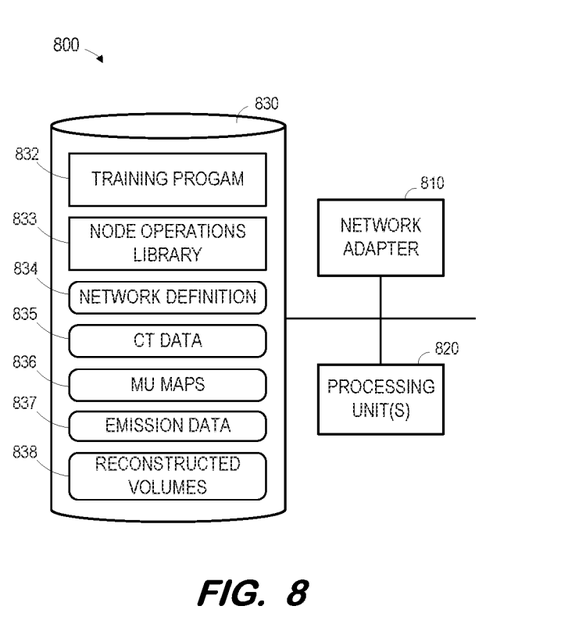
FIG. 8 is a block diagram of an apparatus to execute network training according to some embodiments.

FIG. 8 illustrates computing system 800 according to some embodiments. System 800 may comprise a computing system to facilitate the design and training of a network as is known in the art. Computing system 800 may comprise a standalone system, or one or more elements of computing system 800 may be located in the cloud.

System 800 includes network adapter 810 to communicate with external devices via a network connection. Processing unit(s) 820 may comprise one or more processors, processor cores, or other processing units to execute processor-executable process steps. In this regard, storage system 830, which may comprise one or more memory devices (e.g., a hard disk drive, a solid-state drive), stores processor-executable process steps of training program 832 which may be executed by processing unit(s) 820 to train a network as described herein.

Training program 832 may utilize node operations library 833, which includes code to execute various operations associated with node operations as defined in node operations library 833. According to some embodiments, computing system 800 provides interfaces and development software (not shown) to enable development of training program 832 and generation of network definition 834. Storage device 840 also includes CT data 835 mu-maps 836, emission data 837 and reconstructed volumes 838, which may be used by training program 832 as described above to train a network defined by network definition 834.

Figure 9:
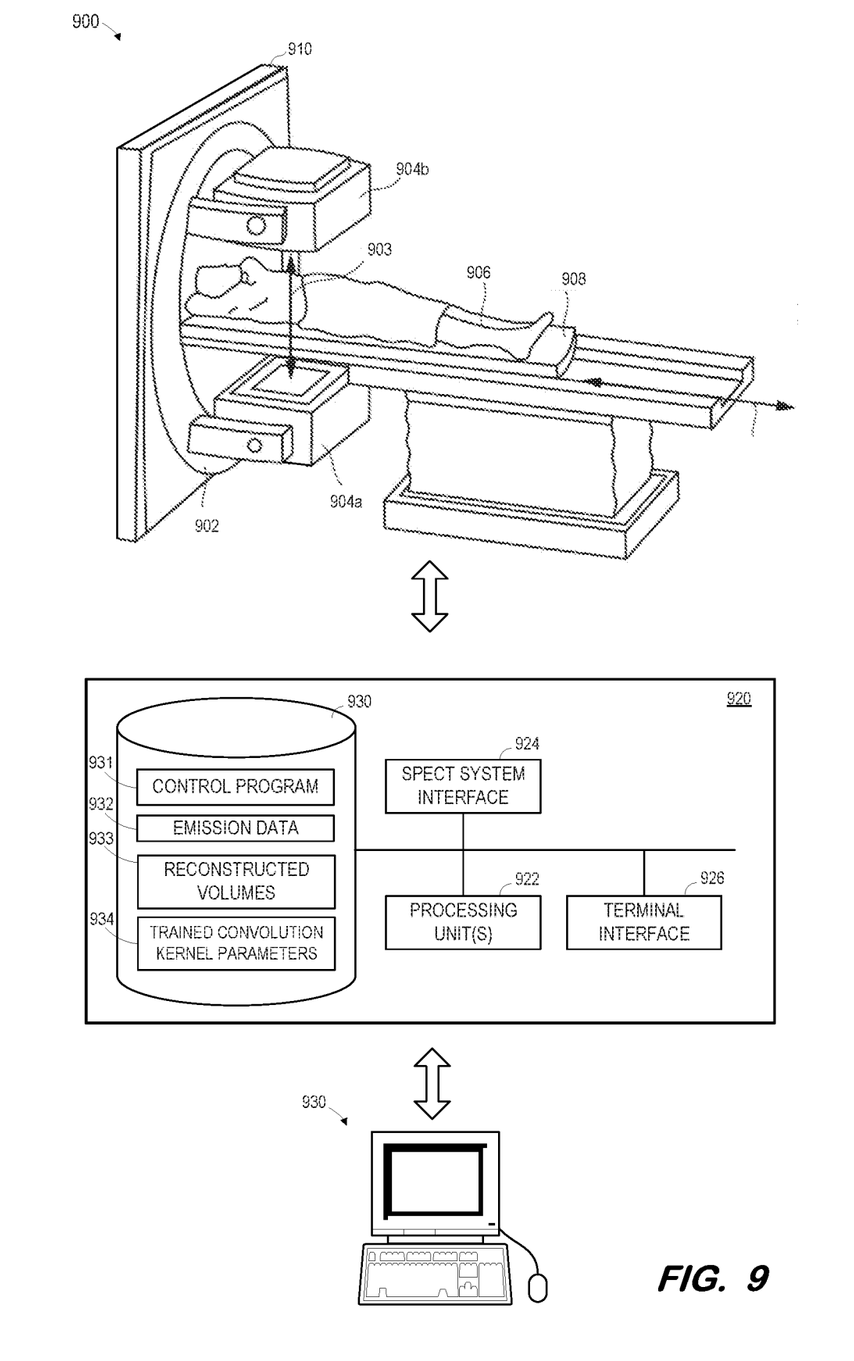
FIG. 9 illustrates an emission imaging system utilizing a trained neural network according to some embodiments.

FIG. 9 illustrates system 900 according to some embodiments. System 900 is a SPECT system which does not include a CT imaging system. System 900 may acquire pre-trained convolution kernel parameters and use the parameters to generate attenuation-corrected volumes without requiring CT data.

Embodiments are not limited to a SPECT imaging system and/or a CT imaging system as described above. For example, embodiments may employ any other imaging modalities (e.g., a magnetic resonance scanner, a positron-emission scanner, etc.) for acquiring emission data. Each of component of system 900 may include other elements which are necessary for the operation thereof, as well as additional elements for providing functions other than those described herein.

System 900 includes gantry 902 to which two or more gamma cameras 904a, 904b are attached, although any number of gamma cameras can be used. A detector within each gamma camera detects gamma photons (i.e., emission data) emitted by a radioisotope within the body of a patient 906 lying on a bed 908. Bed 908 is slidable along axis-of-motion A. At respective bed positions (i.e., imaging positions), a portion of the body of patient 906 is positioned between gamma cameras 904a, 904b in order to capture emission data from that body portion.

Control system 920 may comprise any general-purpose or dedicated computing system. Accordingly, control system 920 includes one or more processing units 922 configured to execute processor-executable program code to cause system 920 to operate as described herein, and storage device 930 for storing the program code. Storage device 930 may comprise one or more fixed disks, solid-state random access memory, and/or removable media (e.g., a thumb drive) mounted in a corresponding interface (e.g., a USB port).

Storage device 930 stores program code of system control program 931. One or more processing units 922 may execute system control program 931 to, in conjunction with SPECT system interface 924, control motors, servos, and encoders to cause gamma cameras 904a, 904b to rotate along gantry 902 and to acquire two-dimensional emission data at defined imaging positions during the rotation. The acquired emission data 932 may be stored in device 930.

One or more processing units 922 may further execute system control program 931 to reconstruct a non-attenuation-corrected volume 933 based on emission data 932. The volume is then input to a network implementing trained parameters 934 to generate a mu-map. The generated mu-map may then be used as described above to reconstruct an attenuation-corrected volume from the emission data.

The reconstructed attenuation-corrected volume may be transmitted to terminal 930 via terminal interface 926. Terminal 930 may comprise a display device and an input device coupled to system 920. Terminal 930 may display any of two-dimensional emission data, reconstructed volumes, mu-maps, etc., and may receive user input for controlling display of the data, operation of imaging system 900, and/or the processing described herein. In some embodiments, terminal 930 is a separate computing device such as, but not limited to, a desktop computer, a laptop computer, a tablet computer, and a smartphone.

Those in the art will appreciate that various adaptations and modifications of the above-described embodiments can be configured without departing from the claims. Therefore, it is to be understood that the claims may be practiced other than as specifically described herein.

What is claimed is:

1. A system comprising:
   a storage device storing a plurality of sets of training data and a plurality of sets of ground truth data, each set of ground truth data corresponding to a respective one of the plurality of sets of training data; and a processor to execute processor-executable process steps stored on the storage device to cause the system to:

input the plurality of sets of training data to a neural network to generate a plurality of sets of output data, each set of output data corresponding to one of the plurality of sets of training data;

determine a first loss based on comparisons of intensities of pixels of each of the plurality of sets of output data with intensities of corresponding pixels of a corresponding one of the plurality of sets of ground truth data;

determine a second loss based on evaluations of whether each of the plurality of sets of output data conforms to a physical constraint; and modify the neural network based on the first loss and the second loss.

2. The system according to claim 1, wherein determination of the second loss comprises determination of the second loss based on evaluations of each set of output data with respect to a physical characteristic.

3. The system according to claim 2, wherein determination of the second loss comprises determination of the second loss based on evaluations of each set of ground truth data with respect to the physical characteristic and comparing the evaluations of each set of output data with respect to the physical characteristic with the evaluations of each set of ground truth data with respect to the physical characteristic.

4. The system according to claim 1, wherein the sets of input training data comprise sets of projection images, the sets of ground truth data comprise first linear attenuation coefficient maps, and the sets of output data comprise second linear attenuation coefficient maps.

5. The system according to claim 4, wherein determination of the second loss comprises determination of a difference between line integrals of a plurality of projections from each of a plurality of pixels of each of the first linear attenuation coefficient maps and line integrals of a plurality of projections from each of a plurality of pixels of a corresponding one of the second linear attenuation coefficient maps.

6. The system according to claim 5, the processor to execute processor-executable process steps stored on the storage device to cause the system to output trained kernels of the neural network to an emission imaging system, wherein the system further comprises the emission imaging system, the emission imaging system to:

acquire a set of two-dimensional emission data;

reconstruct a non-attenuation-corrected volume based on the set of two-dimensional emission data;

input the non-attenuation-corrected volume to a second network comprising the trained kernels;

receive an attenuation coefficient map output from the second network based on the input non-attenuation-corrected volume; and reconstruct an attenuation-corrected volume based on the received attenuation coefficient map and the set of two-dimensional emission data.

7. A computer-implemented method, comprising:

acquiring a plurality of sets of training data and a plurality of sets of ground truth data, each set of ground truth data corresponding to a respective one of the plurality of sets of training data;

inputting the plurality of sets of training data to a neural network to generate a plurality of sets of output data, each set of output data corresponding to one of the plurality of sets of training data;

determining a first loss based on comparisons of intensities of pixels of each of the plurality of sets of output data with intensities of corresponding pixels of a corresponding one of the plurality of sets of ground truth data;

determining a second loss based on evaluations of whether each of the plurality of sets of output data conforms to a physical constraint; and modifying the neural network based on the first loss and the second loss.

8. The computer-implemented method according to claim 7, wherein determining the second loss comprises determination of the second loss based on evaluations of each set of output data with respect to a physical characteristic.

9. The computer-implemented method according to claim 8, wherein determining the second loss comprises determination of the second loss based on evaluations of each set of ground truth data with respect to the physical characteristic and comparing the evaluations of each set of output data with respect to the physical characteristic with the evaluations of each set of ground truth data with respect to the physical characteristic.

10. The computer-implemented method according to claim 7, wherein the sets of input training data comprise sets of projection images, the sets of ground truth data comprise first linear attenuation coefficient maps, and the sets of output data comprise second linear attenuation coefficient maps.

11. The computer-implemented method according to claim 10, wherein determining the second loss comprises determination of a difference between line integrals of a plurality of projections from each of a plurality of pixels of each of the first linear attenuation coefficient maps and line integrals of a plurality of projections from each of a plurality of pixels of a corresponding one of the second linear attenuation coefficient maps.

12. The computer-implemented method according to claim 11, further comprising:

outputting trained kernels of the neural network to an emission imaging system;

acquiring a set of two-dimensional emission data from the emission imaging system;

reconstructing a non-attenuation-corrected volume based on the set of two-dimensional emission data;

inputting the non-attenuation-corrected volume to a second network comprising the trained kernels;

receiving an attenuation coefficient map output from the second network based on the input non-attenuation-corrected volume; and reconstructing an attenuation-corrected volume based on the received attenuation coefficient map and the set of two-dimensional emission data.

13. An imaging system, further comprising:

a scanner to acquire a plurality of two-dimensional sets of emission data; and a processing unit to:

reconstruct a non-attenuation-corrected volume based on the plurality of two-dimensional sets of emission data;

input the non-attenuation-corrected volume to a neural network trained to minimize a first loss, the first loss based on comparisons of intensities of pixels of each of a plurality of output attenuation coefficient maps with intensities of corresponding pixels of a corresponding one of a plurality of ground truth attenuation coefficient maps, and a second loss, the second loss based on evaluations of whether each of the plurality of sets of output attenuation coefficient maps conforms to a physical constraint;

receive an attenuation coefficient map output from the neural network based on the input non-attenuation-corrected volume; and reconstruct an attenuation-corrected volume based on the received attenuation coefficient map and the plurality of two-dimensional sets of emission data.

14. The imaging system according to claim 13, the scanner to acquire a second plurality of two-dimensional sets of emission data; and the processing unit to:

reconstruct a second non-attenuation-corrected volume based on the second plurality of two-dimensional sets of emission data;

input the second non-attenuation-corrected volume to the neural network;

receive a second attenuation coefficient map output from the neural network based on the input second non-attenuation-corrected volume; and reconstructing a second attenuation-corrected volume based on the received second attenuation coefficient map and the second plurality of two-dimensional sets of emission data.

15. The imaging system according to claim 13, wherein the evaluations comprise determinations of a difference between line integrals of a plurality of projections from each of a plurality of pixels of each of the output attenuation coefficient maps and line integrals of a plurality of projections from each of a plurality of pixels of a corresponding one of the ground truth attenuation coefficient maps.

* * * * *